(12) United States Patent
Chewning et al.

(10) Patent No.: US 10,232,801 B2
(45) Date of Patent: Mar. 19, 2019

(54) WEAR SURFACE

(71) Applicant: ESCO Corporation, Portland, OR (US)

(72) Inventors: Scott R. Chewning, Warren, OR (US); Adam M. Jones, Wright, WY (US)

(73) Assignee: ESCO GROUP LLC, Portland, OR (US)

(*) Notice: Subject to any disclaimer, the term of this patent is extended or adjusted under 35 U.S.C. 154(b) by 0 days.

(21) Appl. No.: 14/823,904

(22) Filed: Aug. 11, 2015

(65) Prior Publication Data

US 2016/0046244 A1 Feb. 18, 2016

Related U.S. Application Data

(60) Provisional application No. 62/036,205, filed on Aug. 12, 2014.

(51) Int. Cl.
*B60R 13/01* (2006.01)

(52) U.S. Cl.
CPC .......... *B60R 13/01* (2013.01); *B02C 2210/02* (2013.01)

(58) Field of Classification Search
CPC . B60R 13/01; B60R 13/013; B60R 2013/015; B60R 2013/016; B02C 17/22; B02C 2210/02
USPC .............................................. 296/39.1, 183.2
See application file for complete search history.

(56) References Cited

U.S. PATENT DOCUMENTS

| | | | |
|---|---|---|---|
| 1,534,000 A | 4/1925 | Baker | |
| 2,058,257 A | 10/1936 | Porteous | |
| 2,077,749 A * | 4/1937 | Fischer | E01C 11/24 404/21 |
| 2,155,215 A * | 4/1939 | Beament | B22D 19/00 148/522 |
| 2,181,812 A * | 11/1939 | Kammerer | E06B 1/70 428/52 |
| 2,210,357 A | 8/1940 | Beament | |
| 2,878,904 A | 3/1959 | Fanner | |
| 2,885,156 A | 5/1959 | Wolfe et al. | |
| 3,378,209 A | 4/1968 | Crocheron | |
| 3,578,375 A * | 5/1971 | Finefrock | B60R 13/01 105/422 |
| 3,607,607 A | 9/1971 | Beninga et al. | |
| 3,734,699 A | 5/1973 | Austermann | |
| 3,804,346 A | 4/1974 | Norman | |

(Continued)

FOREIGN PATENT DOCUMENTS

| | | |
|---|---|---|
| JP | H8268521 | 10/1996 |
| SU | 977259 | 11/1982 |
| WO | WO 2009/086590 | 7/2009 |

OTHER PUBLICATIONS

Search Report and Written Opinion for PCT/US2015/044723 dated Nov. 26, 2015 (9 pages).*

*Primary Examiner* — Rodney Mintz
(74) *Attorney, Agent, or Firm* — John Anderton (57) ABSTRACT

A wear surface that is easily modified and fitted for installation to a wearable surface includes alternating longitudinal wear members and retaining members. The wear members consist of a hard material such as white iron with good wear resistance. The retaining members are of a ductile material that is readily welded and overlap the wear members on each side over at least a portion of their length. The retaining members can be welded to the equipment to be protected and retain the wear members which are not readily welded.

34 Claims, 7 Drawing Sheets

(56) References Cited

U.S. PATENT DOCUMENTS

| | | | |
|---|---|---|---|
| 3,912,325 A * | 10/1975 | Sudyk | B60R 13/01 |
| | | | 105/423 |
| 3,953,950 A * | 5/1976 | Sudyk | B60R 13/01 |
| | | | 404/68 |
| 4,029,354 A * | 6/1977 | Valeri | B60P 1/286 |
| | | | 105/423 |
| 4,307,140 A | 12/1981 | Davis | |
| 4,367,255 A | 1/1983 | Blohm | |
| 4,474,861 A | 10/1984 | Ecer | |
| 4,485,975 A | 12/1984 | Eigner | |
| 4,761,317 A | 8/1988 | Ebata et al. | |
| 4,802,705 A | 2/1989 | Elwell | |
| 4,848,683 A * | 7/1989 | Kawatsu | B02C 2/005 |
| | | | 241/294 |
| 4,855,174 A | 8/1989 | Kawamoto | |
| 4,902,038 A * | 2/1990 | Grover | B60R 13/01 |
| | | | 105/422 |
| 5,157,804 A * | 10/1992 | Williams | A47L 23/26 |
| | | | 15/161 |
| 5,261,170 A | 11/1993 | Ward | |
| 5,275,502 A * | 1/1994 | Glaza | E01C 19/522 |
| | | | 404/35 |
| H001318 H * | 6/1994 | Rozenboom | B62D 25/2054 |
| | | | 296/183.2 |
| 5,328,776 A | 7/1994 | Garber et al. | |
| 5,587,218 A * | 12/1996 | Betz | A47G 27/0293 |
| | | | 15/215 |
| 5,607,750 A * | 3/1997 | Liou | B32B 3/30 |
| | | | 296/97.23 |
| 5,915,528 A | 6/1999 | Shmuelov | |
| 6,000,741 A | 12/1999 | Reynolds et al. | |
| 6,007,132 A | 12/1999 | Burg et al. | |
| 6,022,068 A | 2/2000 | D Amico | |
| 6,027,057 A * | 2/2000 | Miles | B02C 17/225 |
| | | | 241/182 |
| 6,033,791 A | 3/2000 | Smith et al. | |
| 6,129,967 A | 10/2000 | Young et al. | |
| 6,174,014 B1 | 1/2001 | Hook et al. | |
| 6,303,241 B1 * | 10/2001 | Miles | B02C 17/225 |
| | | | 428/812 |
| 6,305,731 B1 | 10/2001 | Hook et al. | |
| 6,434,779 B1 * | 8/2002 | Bartlett | A47L 23/26 |
| | | | 15/161 |
| 6,854,808 B2 | 2/2005 | Kostecki | |
| 7,980,527 B2 | 7/2011 | Groenvall | |
| 8,021,738 B2 | 9/2011 | Yaver et al. | |
| 8,039,075 B2 | 10/2011 | Malmberg | |
| 8,052,193 B2 | 11/2011 | Liebert | |
| 8,136,649 B2 | 3/2012 | Burstroem | |
| 8,241,761 B2 | 8/2012 | Garber et al. | |
| 8,505,256 B2 * | 8/2013 | Cerny | E04F 15/10 |
| | | | 472/92 |
| 8,708,391 B2 | 4/2014 | Dunn et al. | |
| 8,822,008 B2 | 9/2014 | Keough | |
| 9,027,266 B2 | 5/2015 | Maher et al. | |
| 9,272,286 B2 * | 3/2016 | Malmberg | B02C 17/22 |
| 9,452,472 B2 * | 9/2016 | Tsypine | B22D 19/00 |
| 9,464,445 B2 * | 10/2016 | Ben-Ezri | E04F 15/02166 |
| 9,545,956 B2 * | 1/2017 | Lu | B62D 25/2072 |
| 2005/0126056 A1 | 6/2005 | Kostecki | |
| 2009/0047543 A1 * | 2/2009 | Garber | B02C 1/10 |
| | | | 428/687 |
| 2009/0173595 A1 * | 7/2009 | Burstrom | B65G 11/166 |
| | | | 193/25 E |
| 2010/0143742 A1 | 6/2010 | Tsypine et al. | |
| 2011/0008569 A1 * | 1/2011 | Madok | B02C 4/305 |
| | | | 428/99 |
| 2011/0181067 A1 * | 7/2011 | Dunn | B60P 1/286 |
| | | | 296/39.2 |
| 2012/0088055 A1 | 4/2012 | Davies | |
| 2013/0094936 A1 | 4/2013 | Hagenbuch | |
| 2015/0030798 A1 * | 1/2015 | Ben-Ezri | E04F 15/02166 |
| | | | 428/64.1 |
| 2015/0056402 A1 * | 2/2015 | Malmberg | B02C 17/22 |
| | | | 428/99 |
| 2015/0191899 A1 * | 7/2015 | Jones | E02F 3/40 |
| | | | 37/444 |
| 2016/0194035 A1 * | 7/2016 | Lu | B62D 25/2072 |
| | | | 296/39.2 |

\* cited by examiner

WEAR SURFACE

FIELD OF THE INVENTION

The present invention relates to wear members to be attached to equipment surfaces.

BACKGROUND OF THE INVENTION

Equipment used in abrasive environments is subject to excessive wear that can erode exposed surfaces. Exposed surfaces of equipment in mining operations where large volumes of earthen materials are extracted and processed are especially subject to wear. There are many methods for extending the service life of exposed components. Material selection for the component can provide improved wear resistance but has to be balanced with other properties and uses of the component. A hard wear layer is often applied to surfaces of a component by welding or other methods to provide a thicker and harder surface that extends the service life of the equipment. This hardfacing can be renewed as it wears away, but the application process is labor intensive and can take the equipment out of service for extended periods. The larger the equipment, the more time is required to apply the hardfacing and the longer the equipment is taken out of service.

Some equipment can be provided with replaceable liners that are installed to cover larger areas of the equipment. Liners have been used in trays of off road dump trucks that accept and dump material hauled from mines. Large dump trucks working in open mines are positioned under a bucket that excavates or gathers blasted material and drops the load, which can weigh hundreds of tons, onto the surface of the tray. The material is hauled to another location and dumped. The material includes hard particles which are held against the tray surface by the tons of material above it. When the tray is tilted back to dump the load, these particles scratch and abrade the surface of the tray. The mines often run continually day and night and the trays of the dump trucks are quickly worn. Buckets can experience similar loading and wear patterns. The liners are attached to the tray surfaces as sacrificial components. They can be large rigid components spanning the tray or they can be assembled from multiple rigid components. These are custom-made to fit a tray of specific shape (or a specific bucket shape) and have to be stored and shipped to the site in a dedicated truck adding to the expense. In addition, dedicated attachment systems are often required to retain the wear surface in the tray of the dump truck.

The most effective materials for wear surfaces are hard materials such as cast white iron. White iron can be cast to a variety of shapes and is very wear resistant. Hard materials such as white iron are difficult to weld as the welding process degrades material properties and promotes cracking. Such wear members typically need to be attached by other non-welding means. A base of a softer metal such as steel is welded on the equipment and then the white iron wear member is secured to the steel base. The steel base is more easily worn than the wear member, but the wear member protects the base, limiting erosion and extending the life of the base.

The cast wear member can be mechanically attached to the base with a lock or other mechanical retention means requiring additional components or more complex castings. The wear members are of a size to be handled and mounted to the base relatively easily. But a large surface can require a large number of wear members to cover the surface that again require time and expense for initially installing the bases and then for replacing each of the multiple wear members to and from the bases. Each of these solutions requires extensive equipment downtime and maintenance man-hours for installation and renewal.

SUMMARY OF THE INVENTION

Equipment that operates in abrasive environments is subject to wear and erosion. Mining equipment that handles earthen materials such as ore or coal can erode surfaces at a very high rate so the equipment requires frequent maintenance to replace wearable surfaces that are exposed to abrasive material loads. This maintenance can require extensive downtime for expensive capital equipment.

The present invention pertains to a wear surface that can be used on a variety of different equipment to extend the service life of the equipment. The wear surface can conform to a range of surface shapes including curved or flat surfaces. The wear surface can be easily trimmed on site to fit a wide range of equipment surfaces. The wear surface is easily attached to the equipment without specialized tools and without custom fasteners. The wear surface can be attached directly to the protected surface. The wear surface reduces the time required for renewal and maintenance of capital equipment and reduces operating costs. The wear surface can also be removed for replacement without specialized tools in short order.

In a preferred embodiment, a wear surface to be mounted to a wearable surface to protect the wearable surface includes a hard wear member; and retention members overlapping the wear member on two sides.

In another aspect of the invention, a wear assembly to be mounted to a surface includes a hard wear member, retention members and a backing where the retention members alternate with the wear member and retain the wear member to the backing.

In another aspect of the invention, a method of applying a wear surface to a substrate comprises attaching a first retention member to the substrate, positioning a wear member adjacent the first retention member and attaching a second retention member to the substrate adjacent the wear member where the first and second retention members retain the wear member to the substrate.

In another aspect of the invention, a wear member to protect a substrate in mining applications comprises white iron where the wear member is retained by adjacent retaining members that overhang the wear member.

In another aspect of the invention, the inventive wear surface includes elongate hard wear members alternating with elongate retention members that overlap each wear member on two sides. The retention members are maintained in a spaced relationship from each other and from the wear members which are retained between the retention members.

In another aspect of the invention, the wear surface includes hard wear members that alternate with retention members that overlap each wear member on opposite sides. Each retention member is attached to a flexible backing.

In an alternative aspect of the invention, a method of applying a wear surface comprises releasing a wear surface from a shipping configuration to an open configuration. The wear surface is trimmed to conform to equipment receiving the wear surface. The trimmed wear surface is installed to the receiving equipment.

In an alternative aspect of the invention, retention members are welded to the equipment through an opening of the exposed surface of the retention member. The spaced retention members overlap a hard wear member to retain the wear member to the equipment during operation.

In an alternative aspect of the invention wear members are retained to operating equipment over the service life of the wear members by retention members overlapping each side of the wear member.

In some embodiments the wear members are free to move in relation to the retaining members and the flexible backing. The wear members can be spaced from one or all of the retaining members and the backing to facilitate relative movement of the members. The wear surface can readily curve or bend transversely to the elongate direction of the wear members to conform to a receiving surface. The wear surface can be reduced in lateral extent by rolling and overlapping to facilitate shipping.

In some embodiments the wear surface is mounted to the tray of an off road dump truck for mining. Alternatively, the wear surface can be mounted to a surface of a bucket that gathers deposited earthen materials and dumps them in a new location. The wear surface can be mounted to other equipment such as continuous conveyors, chutes and hoppers.

DETAILED DESCRIPTION OF THE PREFERRED EMBODIMENTS OF THE INVENTION

Wear members are applied to many kinds of equipment to extend the service life of the equipment. Without wear members, exposed broad surfaces of equipment experience severe abrasion and wear and can be worn away by abrasive materials.

A replaceable wear surface 20 that is easily shipped, fit and attached to the surface of equipment is generally shown in FIGS. 1-10. Equipment used in an abrasive environment is shown as a dump truck 10 with a bed or tray 12. Material excavated is dropped into the tray of the off road dump truck. The truck hauls the material to a processing station where the tray is tilted to dump the material out through the open back of the tray. A large truck can carry a payload of up to 350 metric tons. Especially when sliding out the back of the tray, the movement of abrasive materials bearing on the tray surface under the payload erodes the tray surface very quickly. Although an off road dump truck is shown in these examples, this is for the purpose of illustration and should not be considered as a limitation. The wear surface can be used on other surfaces exposed to abrasive materials such as conveyors, rolling mills and buckets or other equipment used in abrasive environments.

Wear surface 20 is shown with alternating elongate wear members 24 and retaining members 26. The retaining members can optionally include openings 28 extending between a top surface 26B to a bottom surface 26A.

Backing 22 supports the alternating elongate wear members 24 and elongate retaining members 26. The retaining members overlap the wear members on each side generally along the length of the wear member, although in some embodiments the retainers overlap the wear members intermittently along its length. In a preferred embodiment, the retaining member is wider at a top side 26B than the bottom side and diverges extending away from a bottom side 26A. The retaining members are attached to the backing material at the bottom side 26A.

Figure 2:
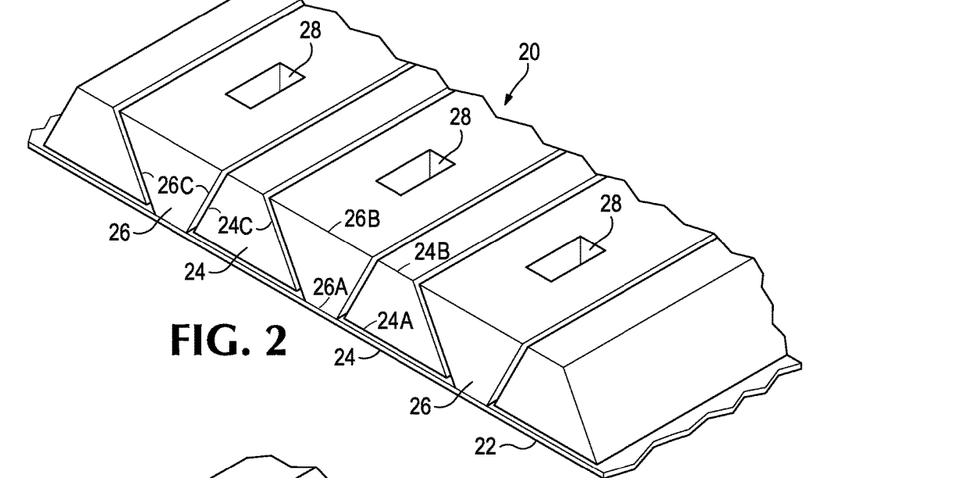
FIG. 2 is a perspective view of a section of a wear surface.
Figures 3, 4:
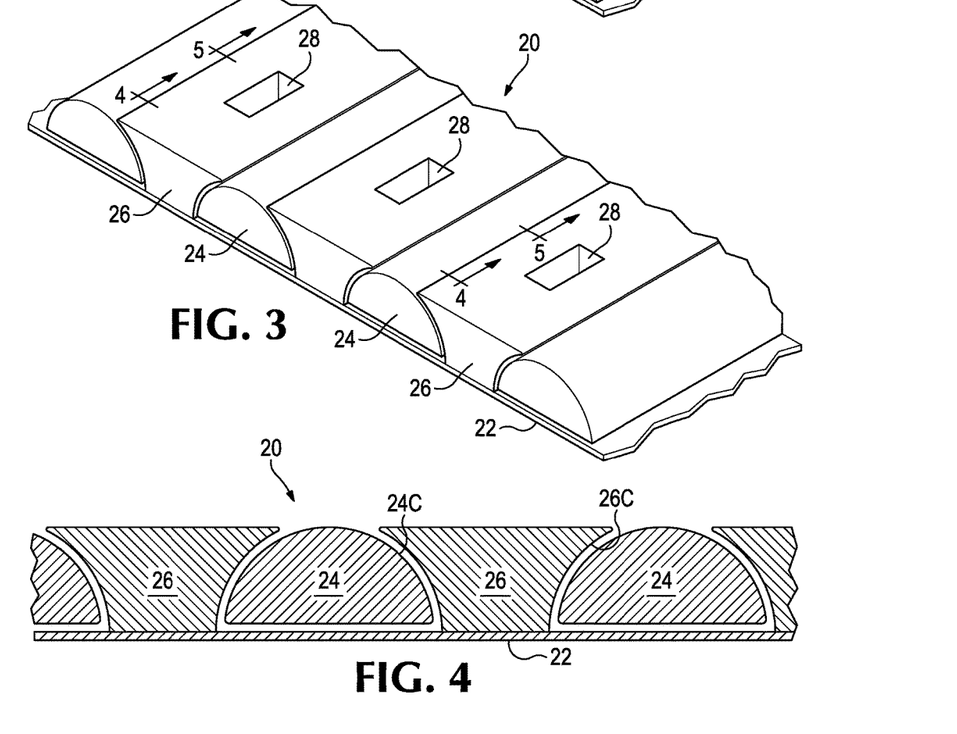
FIG. 3 is a perspective view of an alternative configuration of a section of a wear surface.
FIG. 4 is a cross section view taken along line 4-4 in FIG. 3.

The wear member is wider at a bottom surface 24A that faces the backing material 22 and converges extending away from the bottom surface to a top surface 24B. The adjacent converging and diverging side surfaces of the wear member and the retaining member can conform to each other. FIG. 2 shows side surfaces 24C and 26C as flat and angular surfaces providing a trapezoidal cross section for both the wear and retaining members. FIG. 3 shows the wear member side surfaces as curved arcuate surfaces that reflect the adjacent retaining member side surface. The wear members each has a half round cross section. These are examples. The side surfaces can take on different shapes that do not mirror the corresponding side surface as long as the retaining member substantially overlaps the adjacent wear member side surface over a significant portion of the wear member side surface, i.e., over an adequate length of the wear member to retain it during use.

The wear members generally are a harder material than the retainer members or the backing material. The wear members are intended to be the primary wear surface for contact with the abrasive materials and may consist of white iron or other material. Due to their material properties these metals can be difficult to weld and tend to crack or fail at the welds under stress. The retainer members can be a softer material than the wear members. While the retainer members also contact the abrasive materials and wear more quickly than the wear members, they have better weld qualities and can be attached to adjacent structural components more effectively. As material wears from the retainer members, the wear members are more prominent and wear of the retainer members diminish. The combination of retainer members attached to the equipment structure and wear members resistant to erosion retained by adjacent overlapping retainer members takes advantage of the best material properties of both members to provide an advantageous wear surface.

Alternatively, the wear members can be a softer material that would be difficult to attach to the wearable surface. For example, the wear members can be rubber or a polymer and are retained by the retaining members. In an alternative embodiment, the wear members and retention members are of similar hardness.

As well as being difficult to weld, hard wear members made from hard materials such as white iron or ceramic are too brittle to use in many applications. Alternating the hard wear members with the more ductile retention members makes it possible to use the wear members in a broader range of heavy duty applications than would be possible for only brittle members. Brittle wear members which break during operations can still be retained to the wearable surface.

The backing material 22 can be any material that maintains the spacing and sequencing of the wear members and retaining members and provides transverse flexing of the wear surface. The backing material can consist of individual wires or bands extending transversely to the elongate members. The backing material can, for example, be an expanded metal mesh, fabric, welded or woven metal wire or a synthetic material. Other materials and configurations can be used.

Each retaining member 26 is attached to the backing material 22 to maintain spacing and sequencing. Each retaining member may be spot welded to the backing material at sequential points along the length of the member. Alternatively, the retaining member can be adhered continuously along its length to the backing material. Alternatively the retaining member can be attached to the backing 22 by gluing, taping or other method. Retaining members could be bolted or otherwise mechanically secured in place. The retainer members can be welded to a support such as slats running perpendicular to and under the members. The wear members 24 can each be similarly attached to the backing material. Alternatively, the wear members can be maintained in sequence and spacing only by the adjacent overlapping retaining members. The wear members 24 may float separate from the backing material 22 to be retained by the overlapping retaining members 26. End stops 30 can be used to limit axial movement.

The backing material retains the wear and retainer members of the wear surface prior to installation. The wear surface is preferably installed with the backing material in place. Once the wear surface is installed to equipment, the members are maintained in position by their attachment to the equipment rather than attachment to the backing material. Alternatively, the backing material may be separated from the wear and retainer members before the retaining members are secured to the equipment.

Different areas of the protected surface, such as a bucket, may wear at different rates. The lower face of the bucket may wear at a much higher rate than the top surface of a bucket. Wear member materials may be selected to provide a specific toughness and hardness to wear at a specific rate. Different areas of the wear surface can then be customized for different sections of the bucket experiencing different rates of wear. For example, the top surface of the bucket may have wear members of ceramic and the lower surface may have wear members of white iron. As a result, the wear surface may reach the end of its service life with similar amounts of wear on all areas of the bucket. Although the retaining members are preferably the same, they could be of different materials as well.

Similarly, areas that experience impact failures, such as the dump zone in a truck tray, can be fitted with wear members that mitigate that failure mode while areas that experience the highest abrasion rates, such as the tail of the same truck tray, can be fitted with wear members that, while inappropriate for the dump zone, will maximize service life in that high abrasion area at the tail. This zone specific customization can be built into a single wear surface from the factory and can then be further customized throughout the life of the flex plate as sections are repaired or replaced. Alternatively, the wear surface can be customized on installation at the site in response to observed wear rates.

The wear surface is generally allowed to flex or bend about a longitudinal axis extending with the elongate wear and retainer members. This allows the wear surface to conform to a transversely curved surface such as the tray of the dump truck of FIG. 1. The wear surface can flex to the curve of the equipment without being preformed to that particular shape. The retaining members are generally spaced from the adjacent retaining members so each intervening wear member can shift out of the plane of the backing material without binding. Alternatively, the member may be spaced so they contact adjacent members and slide against each other on flexing.

The wear surface can flex longitudinally about a transverse axis as well, i.e., along the length of the wear members. This flex requires the wear members to bend as compared to bending of the wear surface about the longitudinal axis where the backing flexes. Hard materials used in the wear members are prone to cracking rather than bending which limits how far the wear surface can bend about a transverse axis to conform to curving surfaces.

Figures 1, 1A:
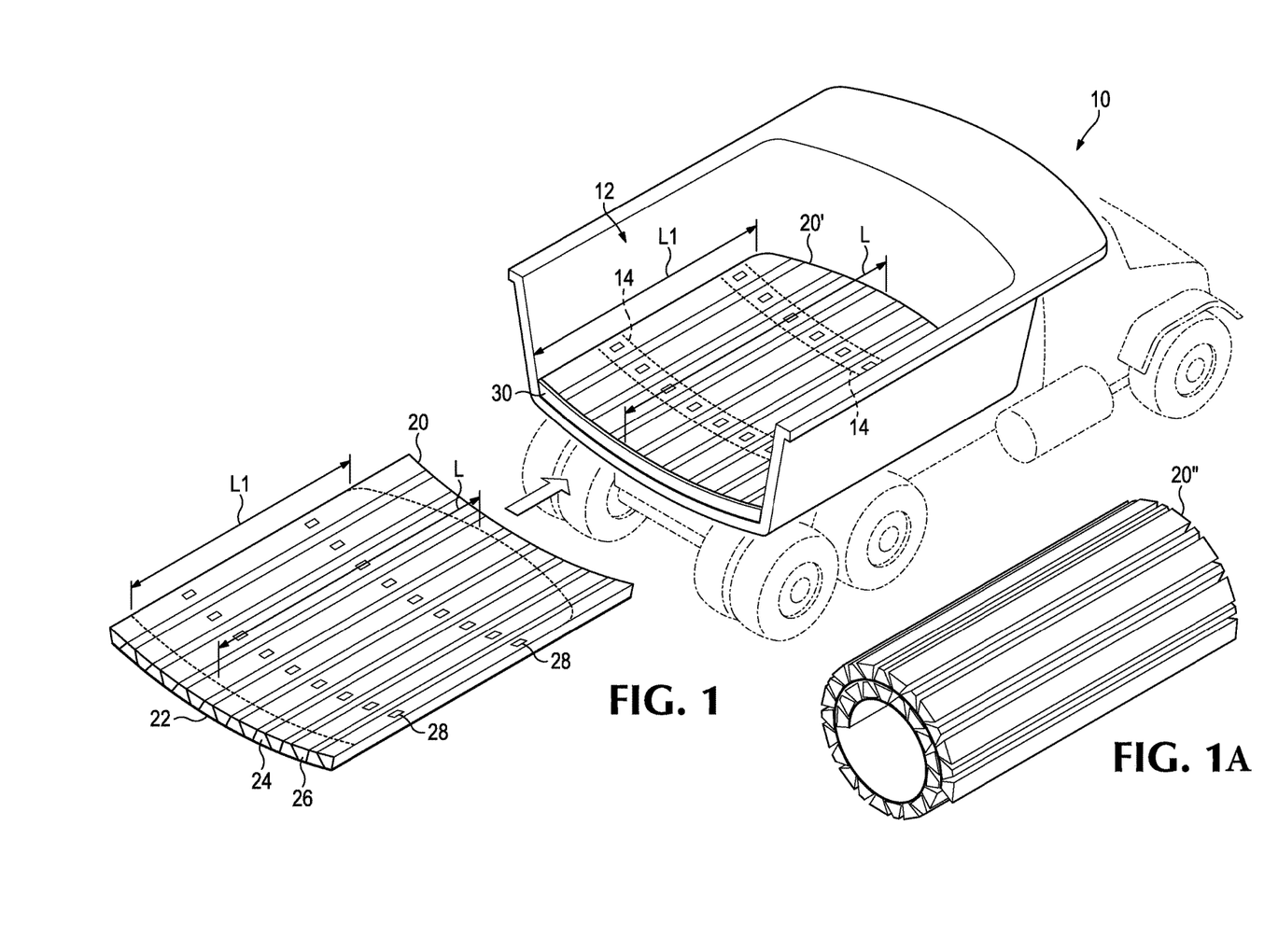
FIG. 1 is a perspective view of a wear surface being trimmed and installed in the tray of a dump truck.
FIG. 1A is a perspective view of the wear surface in a shipping configuration.

The wear surface of the preferred embodiment is shown in FIG. 1 with dotted lines that indicate portions to be trimmed from the wear surface to conform to tray 12. Trimming the wear surface to conform to the tray allows the wear surface to lie in the bottom of the tray and cover a majority of the surface with limited gaps around the edge. The retaining and wear members can be cut with a cutting torch, abrasive blade, serrated blade or any other standard method for cutting hard metals, and is then installed as shown as wear surface 20'. The installation can include a block or retainer 30 at the lip of the tray rearward of the wear surface that prevents the wear members from sliding out of the tray. The wear surface 20 can be formed to fit a particular surface, such as a particular truck tray, so that no at site trimming is needed. The retaining members 26 and wear members 24 can each extend the full length L1 or they both or either may extend only a portion of the full length. For example, retaining members and/or wear members may be arranged end to end to extend the full length L1. Alternatively, the wear members and the retaining members may have gaps between the ends of the axially adjacent members.

The tray 12 is shown with an arcuate front end with a length at the middle of the tray of L. The length of the tray tapers towards the sides to a length of L1. Wear surfaces are often installed before any wear of the tray occurs as well as to renew worn trays. The elongate components are held in relative position before installation by a flexible backing material 22.

A separate wear surface 20" is shown in FIG. 1A rolled in a configuration that reduces the lateral extent of the wear surface to facilitate shipping. Off road trucks are generally wider than is allowed on public roads. A full size tray liner would be difficult to ship to the site for installation due to its width. By reducing the size of the surface, a full size liner can be easily shipped in the rolled configuration on a flat bed or other truck over public roads.

Alternatively, the wear surface may be supplied in multiple sections more limited in extent. For example, the wear surface may comprise several sections three meters long on each side. A wear surface can be protected by attaching each of the wear surface sections to the surface adjacent the previous section to provide full coverage.

Figure 5:
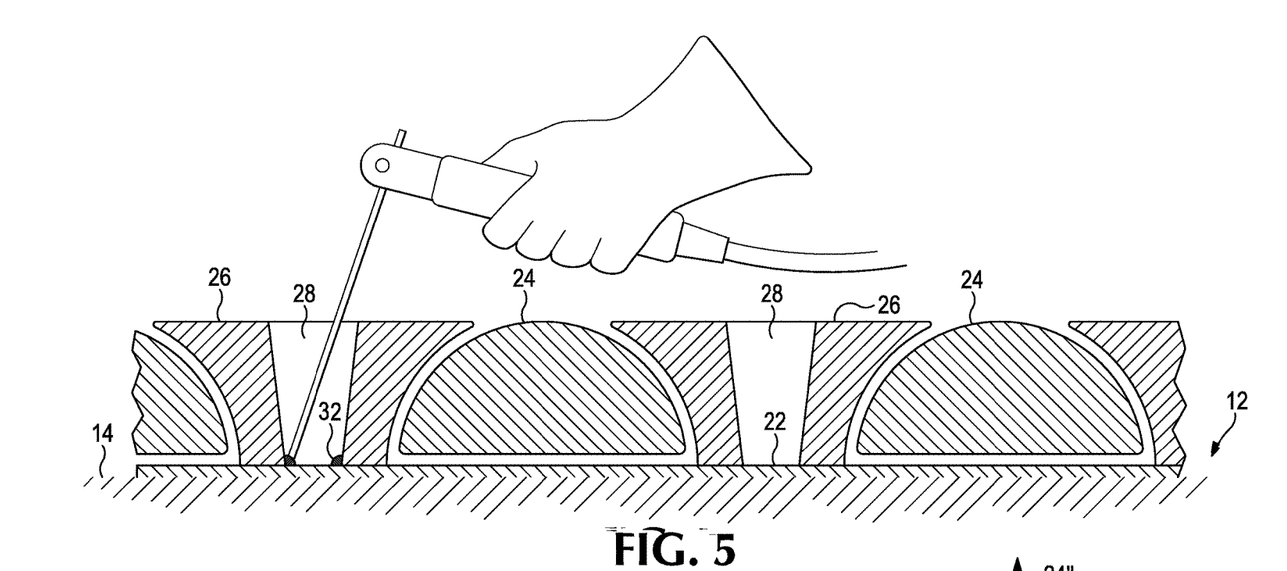
FIG. 5 is a transverse cross section of the wear surface showing an opening and welding of the retention member.

Each retaining member 26 can include an opening 28 that extends between the bottom side 26A and the top side 26B. Equipment 10 is shown with transverse structural members 14 that follow the contour of the tray 12. Wear surface 20 can be trimmed so openings 28 overlay structural members 14 when the wear surface is installed into the tray. The retaining members 26 can be welded 32 to the truck tray over the structural member 14 through opening 28 to secure the wear surface to the equipment 10 as shown in FIG. 5. The retaining members can be welded or secured to the wearable surface at other locations. Again the softer, more ductile material of the retaining members is more weldable than the harder material of the wear members.

Other attachment methods are possible. For example, separate retainers can be used to attach the retainer members to the equipment such as threaded bolts.

Figure 6:
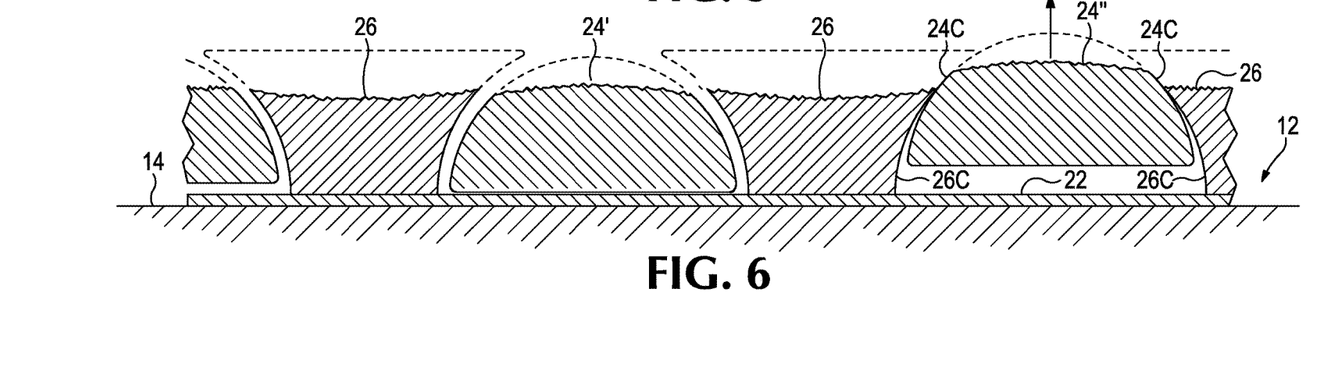
FIG. 6 is a transverse cross section of the wear surface showing wear.

In operation, when attached to equipment, the wear surface 20 will erode with exposure to abrasive materials. FIG. 6 shows an installed wear surface after exposure to abrasive materials. The original dimensions of the wear members and retaining members are shown by dotted lines. The retainer members 26 are shown with more material removed than the wear members 24 as they are a softer material and wear more quickly. A wear member 24' is shown resting on the backing material 22 and spaced from both adjacent retainer members. Wear member 24" is separate and spaced from the backing material by the accumulation of fines. Wear member 24" even with significant material worn away from the wear and retainer members continues to be retained by the overlapping portions of the adjacent retaining members.

Figure 7:
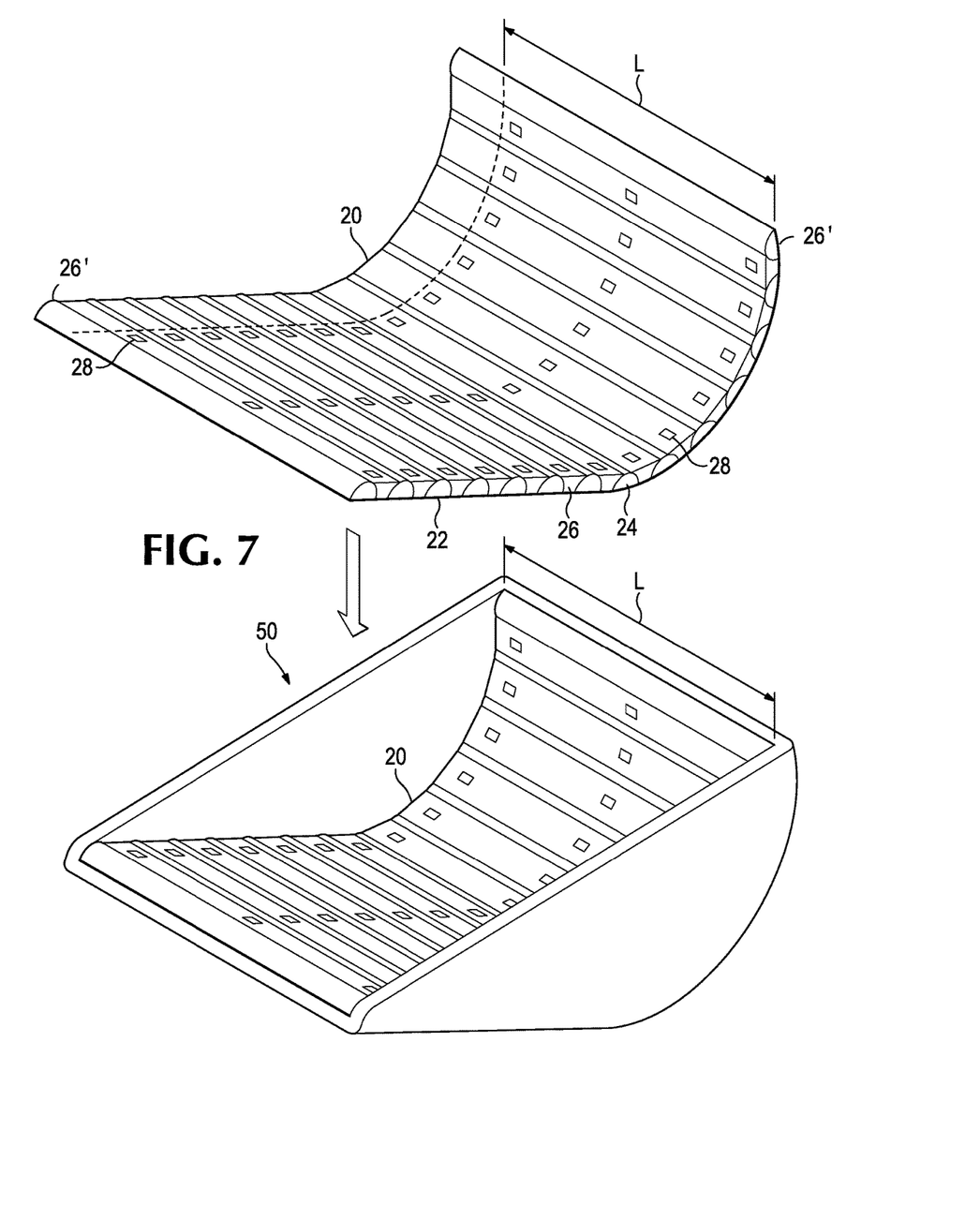
FIG. 7 is a perspective view of a bucket and a wear surface.

The uneven surface of the wear surface can serve to control dumping of materials from the equipment. FIG. 7 shows a bucket 50 with a width L typically used in mining for moving and loading materials. A wear surface 20 for the bucket is marked with a dotted line for trimming at a length L to fit in the bucket. Installed in the bucket, the longitudinal wear and retainer members are transverse to the flow of materials into and out of the bucket in comparison to the off road dump truck illustrated in FIG. 1. The alternating wear members 24 and retaining members 26 tend to interrupt the sliding of materials as they flow over the surface and reduce the velocity as they leave the bucket. This reduces the impact of the materials on the receiving surface such as the tray of the truck, reducing wear on the tray.

The terminating or outermost members of the wear surface are retaining members 26. Some embodiments of the retaining members may project and provide a ledge without an adjacent wear member. A modified retaining member 26' can be provided. The modified retaining member can be rounded on one side or angled to provide a smooth transition of materials into and out of bucket 50 or other mining tool.

Figure 8:
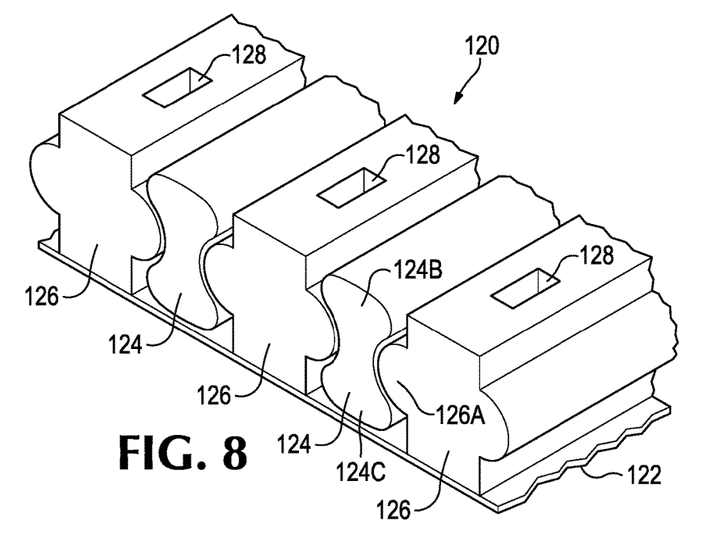
FIG. 8 is a perspective view of an alternative embodiment of a section of a wear surface.

Other configurations can be contemplated with different cross sectional shapes that perform a similar function. In an alternative embodiment, FIG. 8 is a perspective view of a wear surface 120 with elongate wear members 124 alternating with elongate retainer members 126 with openings 128 for mounting the wear surface. The wear members are generally barbell shaped or biconcave with recesses 124A on each side that correspond to protrusions 126A of the retainer members. The top and bottom sections of the wear members 124B and 124C are wider than the recessed portion. The top section of the wear member could be wider and partially overlie the retaining members 126. The wear members are retained in the wear surface by the retainer member protrusions 126A in the wear member recesses 124A. The retainer members are attached to the backing 122 which is ductile and allows the wear surface to flex and conform to curved surfaces while retaining the wear members to the wear surface.

Figure 9:
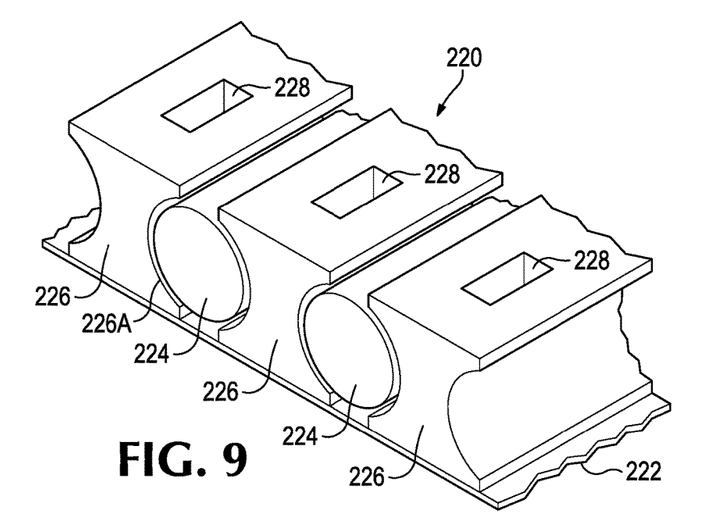
FIG. 9 is a perspective view of an alternative embodiment of a section of a wear surface.

In an alternative embodiment, FIG. 9 is a perspective view of a wear surface 220 with elongate wear members 224 alternating with elongate retainer members 226 and openings 228 for mounting the wear surface. The wear members are generally round and the retainer members have side recesses 226A that correspond to the round wear members. The retainer members are attached to the backing 222 which is ductile and allows the wear surface to flex and conform to curved surfaces while retaining the wear members to the surface.

Figure 10:
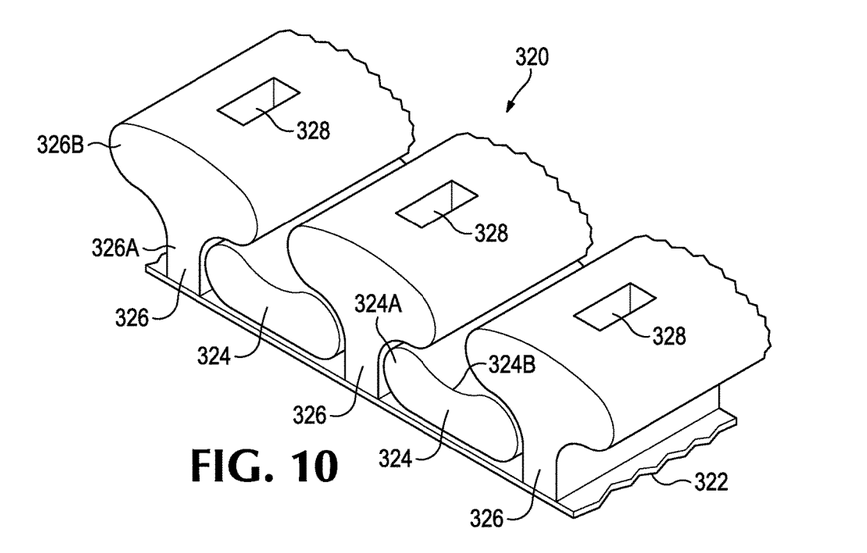
FIG. 10 is a perspective view of an alternative embodiment of a section of a wear surface.

In an alternative embodiment, FIG. 10 is a perspective view of a wear surface 320 with elongate wear members 324 alternating with elongate retainer members 326 with openings 328 for mounting the wear surface. The wear members are flattened with round sides 324A and a recess 324B at the upper surface. The retainer members are generally T shaped or mushroom shaped with a stem or lower portion 326A that attaches to the backing 322 and the upper surface 326B is wider than the stem. The upper surface is shown overlapping the wear member 324 and retains the wear member to the wear surface. The retainer members are attached to the backing 322 which is ductile or flexible and allows the wear surface to flex and conform to curved surfaces while retaining the wear members to the wear surface.

Figure 10A:
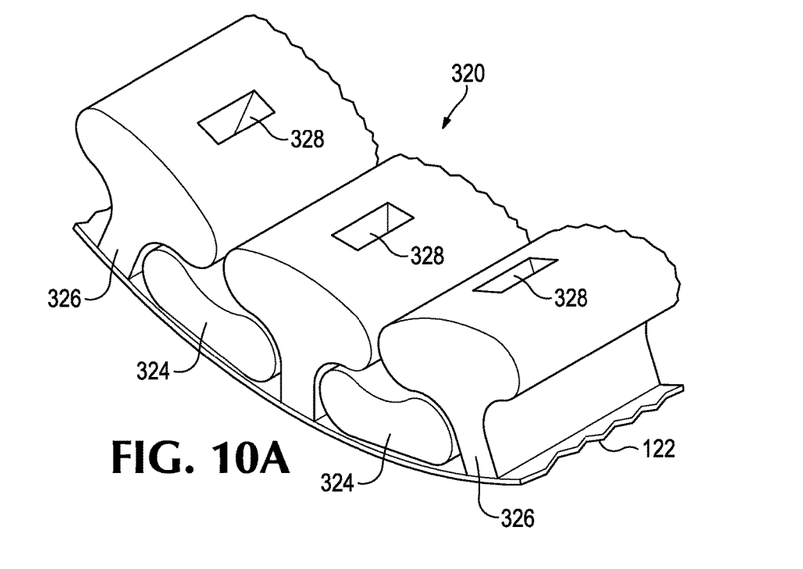
FIG. 10A is a perspective view of an alternative embodiment of a section of a wear surface.
Figure 11:
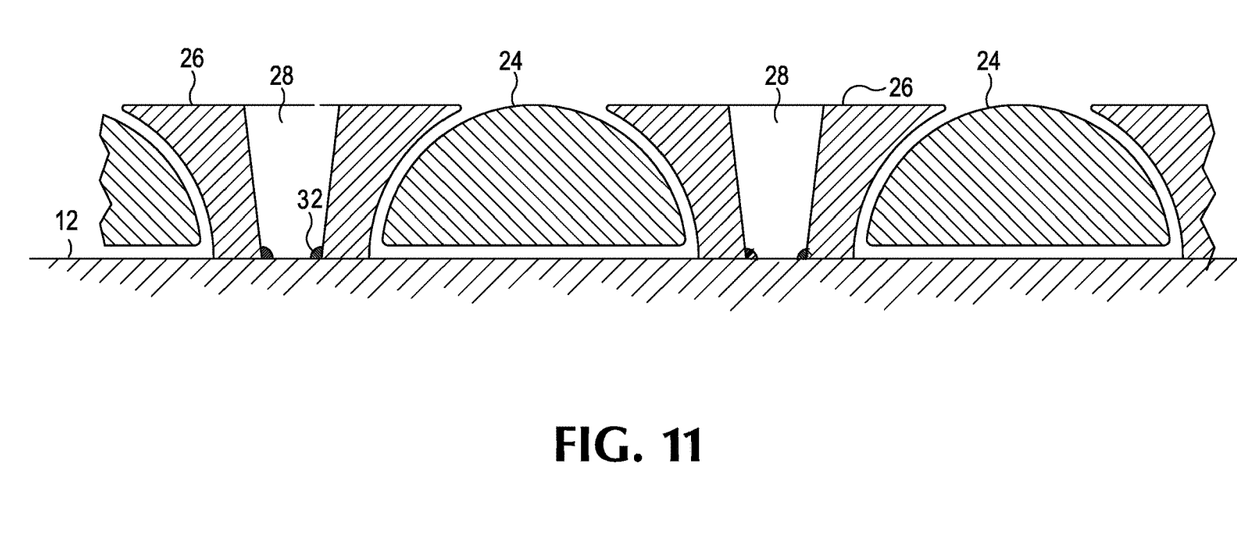
FIG. 11 is a transverse cross section of the wear surface welded to the wearable surface.

In this embodiment when the wear surface flexes with the sides moving up relative to the middle moving down, each member will tend to rotate about its longitudinal axis and the retainer member upper surfaces move towards each other. As the retainer members rotate and the upper surfaces move towards each other over the wear members, the upper surface of the wear member receive the retainer member upper surfaces as seen in FIG. 10A. This allows the wear surface to flex to a greater degree than would be possible if the retainer member upper surfaces contacted a convex upper surface of the wear member that limited travel of the retainer member.

While the application has described the invention primarily in terms of mining equipment, the invention could also be employed in other applications where large surfaces are subject to wear and erosion. It is believed that the disclosure set forth herein encompasses multiple distinct inventions with independent utility. While the wear surface has been disclosed in its preferred form, the specific embodiments thereof as disclosed and illustrated herein are not to be considered in a limiting sense as numerous variations are possible. The embodiments and figures are examples for the purpose of explanation and illustration. Any combination of features which performs a similar function will fall within the scope of this disclosure.

The invention claimed is:

1. A wear surface for protecting a wearable surface of mining equipment exposed to abrasive material, the wear surface comprising wear members each having two opposite sides, and spaced and separate discrete retention members welded to the wearable surface and overlapping each said wear member on the two sides to retain the wear members over the wearable surface, wherein each said wear member is independently movable with respect to the retention members and the wearable surface.

2. The wear surface of claim 1 wherein each of the retention members includes at least one opening for welding each said retention member to the equipment.

3. The wear surface of claim 1 wherein the wear member is white iron.

4. The wear surface of claim 1 wherein the retention members are composed of a metal that is softer than the wear member.

5. The wear surface of claim 1 wherein at least two wear members are composed of different materials.

6. The wear surface of claim 1 wherein the retention members wear at a higher rate than the wear members.

7. The wear surface of claim 1 wherein the wear member and the retention members are elongate members with aligned longitudinal axes.

8. The wear surface of claim 1 wherein the retention members diverge and the wear member converges extending from the wearable surface.

9. The wear surface of claim 1 wherein the wear member is a half round in cross section.

10. The wear surface of claim 1 wherein the retention members and the wear member are each trapezoidal in cross section.

11. The wear surface of claim 1 wherein the retention members are wider at a middle portion and the wear member is narrower at a middle portion to correspond with the retention members.

12. The wear surface of claim 1 wherein the retention members are T shaped.

13. The wear surface of claim 1 including a backing layer adapted to be secured to the equipment, wherein each said retention member is secured to the backing layer.

14. The wear surface of claim 13 wherein the backing layer is flexible.

15. The wear surface of claim 13 wherein each of the retention members includes at least one opening for welding each said retention member to the backing layer.

16. The wear surface of claim 1 wherein the sides of the wear member is arcuate, and each of the retention members have arcuate sides to complement the arcuate sides of the wear member.

17. The wear surface of claim 16 the arcuate sides of the wear member are convex and the arcuate sides of each of the retention members are concave.

18. The wear surface of claim 16 the sides of the wear member continuously converge as the sides extend away from the wearable surface.

19. The wear surface of claim 16 the wear member is a metal harder than the retention member.

20. The wear surface of claim 16 the wear member floats between the retention members.

21. The wear surface of claim 1 wherein the wear members have a width and the retention members cover a majority of the width of the wear member.

22. The wear surface of claim 21 the wear member is elongate and the sides of the wear member converge as the sides extend away from the wearable surface.

23. The wear surface of claim 21 where the wear members are a metal harder than the retention member.

24. The wear surface of claim 21 the wear members float between the retention members.

25. A wear surface for protecting a wearable surface of mining equipment exposed to abrasive material, the wear surface comprising a plurality of wear members overlying the wearable surface and free of direct securement to the wearable surface, and a plurality of discrete retaining members individually welded to the wearable surface and overlapping the wear members to retain the wear members to the wearable surface, wherein each said wear member is independently movable with respect to the retaining members and the wearable surface.

26. The wear surface of claim 25 wherein each of the wear members includes a base surface facing the wearable surface, an exposed surface opposite the base surface, and opposite sides extending between the base and exposed surface, and the retaining members overlie the exposed surface.

27. The wear surface of claim 25 including a backing underlying the wear members and retaining members, wherein each said retaining member is secured to the backing.

28. The wear surface of claim 27 wherein the backing is flexible.

29. A wear surface for protecting a wearable surface of mining equipment exposed to abrasive material, the wear surface comprising a plurality of wear members and a plurality of discrete retaining members overlapping and retaining the wear members over the wearable surface, the retaining members each being separately welded to the wearable surface and shaped relative to the wear members to accommodate both a planar or curved wearable surface, wherein each said wear member is independently movable with respect to the retaining members and the wearable surface.

30. The wear surface of claim 29 wherein each said wear member is bordered on each of a pair of opposite sides by one said retaining member.

31. The wear surface of claim 29, including a backing underlying the wear members and retaining members, wherein each said retaining member is secured to the backing.

32. The wear surface of claim 29, wherein the backing is flexible.

33. The wear surface of claim 29 wherein a different one of the retaining members is positioned between each adjacent pair of the wear members.

34. The wear surface of claim 29 wherein the retaining members are discontinuous.

* * * * *